United States Patent [19]

Kadlec

[11] 4,253,117

[45] Feb. 24, 1981

[54] MULTIVIBRATOR SYNCHRONIZATION SYSTEM FOR VIDEO DISPLAY

[75] Inventor: Joseph Kadlec, Berwyn, Ill.

[73] Assignee: Zenith Radio Corporation, Glenview, Ill.

[21] Appl. No.: 88,729

[22] Filed: Oct. 26, 1979

[51] Int. Cl.³ .............................................. H04N 5/04
[52] U.S. Cl. .................................... 358/158; 331/145
[58] Field of Search .................. 358/148, 158; 331/20, 331/145

[56] References Cited

U.S. PATENT DOCUMENTS

| 3,569,864 | 3/1971 | Scherrer | 331/145 |
| 3,611,176 | 10/1971 | Christopher | 331/20 |
| 4,001,715 | 1/1977 | Fukaya | 358/158 |
| 4,054,847 | 10/1977 | Fukaya | 331/145 |
| 4,144,544 | 3/1979 | Fernsler | 358/158 |

*Primary Examiner*—Robert L. Griffin
*Assistant Examiner*—Michael A. Masinick
*Attorney, Agent, or Firm*—Thomas E. Hill

[57] ABSTRACT

A system for increasing synchronization signal injection to a free-running multivibrator in the horizontal drive circuit of a video display which enhances synchronization signal frequency capture range is disclosed. A reduction in synchronization input signal amplitude due to an input signal voltage cutoff threshold which reduces spurious multivibrator inputs is compensated for by coupling the multivibrator synchronization input signal to the emitter and collector of both of the multivibrator's coupled transistors.

6 Claims, 9 Drawing Figures

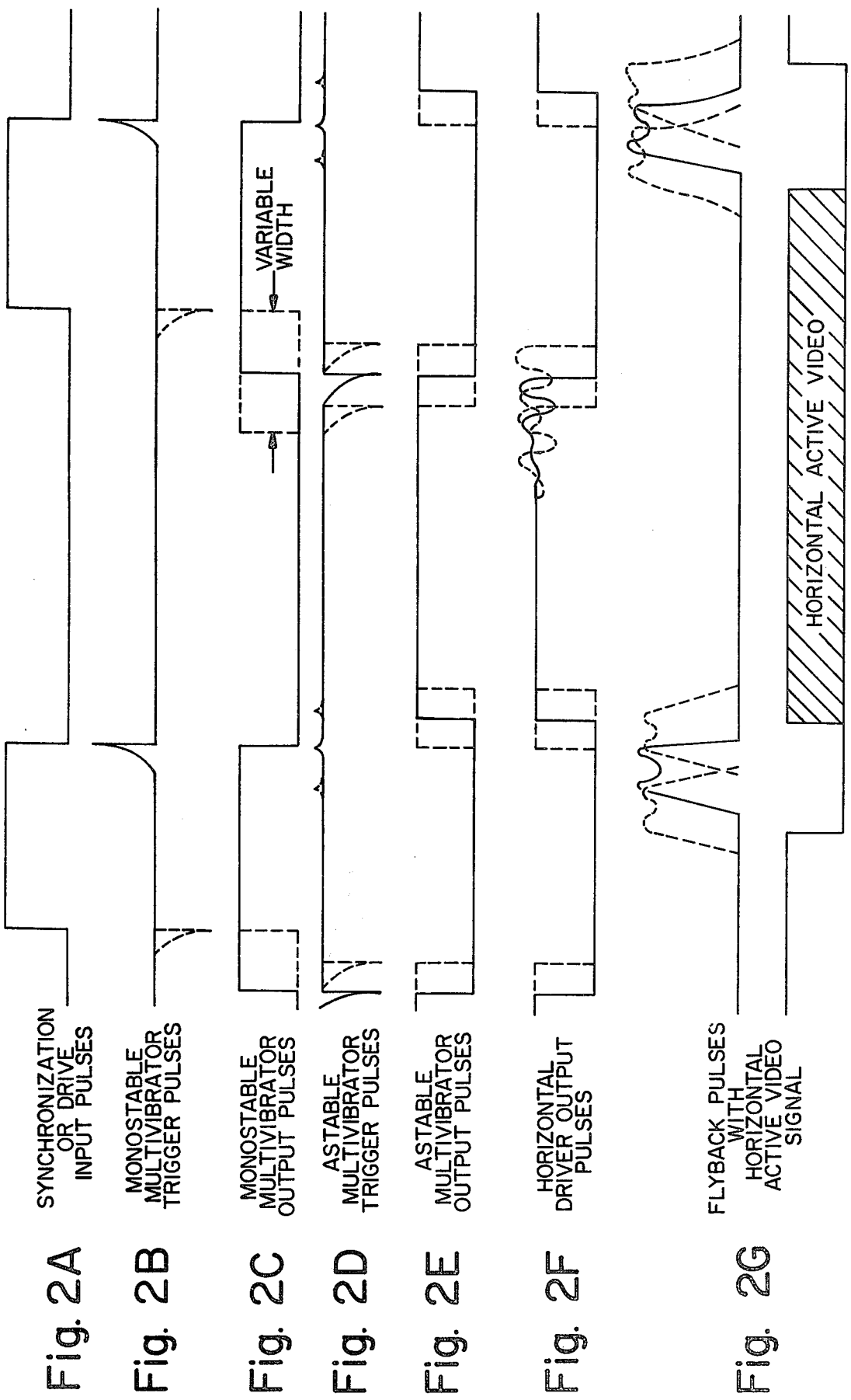

MULTIVIBRATOR SYNCHRONIZATION SYSTEM FOR VIDEO DISPLAY

CROSS REFERENCE TO RELATED APPLICATIONS

This application is related to, but in no way dependent upon, the following applications both of which are assigned to the assignee of the present application: Ser. No. 077,517, filed Sept. 20, 1979, entitled "Horizontal Drive Circuit for Video Display," in the names of Richard Steinmetz and Gregory J. Beaumont, and Ser. No. 075,566, filed Sept. 14, 1979, entitled "Anti-Ringing Circuit for CRT Deflection Yoke," in the name of Gregory J. Beaumont.

BACKGROUND OF THE INVENTION

This invention relates in general to the synchronization of horizontal sweep in a video display with input synchronization pulses and in particular to the use of a multivibrator combination to achieve improved sweep synchronization.

Video information is displayed by a television receiver on a raster which is scanned horizontally at a first rate, and vertically at a second, generally slower rate. Video information is presented as amplitude-modulated synchronizing pulses by which the raster scanning of the television receiver is synchronized with the video input information. For proper picture framing, it is required that the frequency and phase of oscillation produced by the horizontal sweep system be synchronized with the frequency and phase of the horizontal synchronization signal transmitted from the broadcast station.

The most common approach to signal synchronization in television receivers utilizes a phase locked loop in which a phase detector has horizontal rate synchronization pulses applied to one input and ramp signals related to horizontal deflection applied to the other input. The phase detector responds to these inputs and produces control pulses which are filtered and used to control a horizontal-rate oscillator at a frequency which is an average of the incoming synchronizing signals. The horizontal oscillator, in turn, drives the horizontal deflection generator producing recurrent trace pulses which are integrated to produce the recurrent ramp, or sawtooth, signal input to the phase detector. Operating limitations in a phase locked loop system arise, however, when input synchronization signals vary over a large frequency range. The variation of input synchronization signal frequency becomes a critical operating parameter when a video display is used in a non-television type of application. For example, a video display used in a computer terminal or in a data display presentation system may be required to interface with a great variety of input synchronization signals. The typical television receiver not only lacks the flexibility to interface with this great variety of input signals, but also is incapable of controlling the presentation to fit a particular performance requirement, e.g., using the periphery of the display's raster to present data of one type and the center of the raster to present data of another type.

An improved approach to the synchronization of horizontal sweep in a video display with video synchronization input pulses is described and claimed in related patent application Ser. No. 077,517, filed Aug. 20, 1979, entitled "Horizontal Drive Circuit for Video Display," in the names of Richard Steinmetz and Gregory J. Beaumont, referred to earlier in the present application. The circuit disclosed therein utilizes a monostable multivibrator responsive to the leading, positive-going edge of the input synchronization pulses in combination with an astable multivibrator which is responsive to the trailing, or negative-going, edge of the monostable multivibrator output. The astable multivibrator locks on to the frequency of the input synchronization pulses and introduces a fixed delay between the start of synchronization and the initiation of the horizontal flyback pulse. In addition, the monostable multivibrator triggers the astable multivibrator to produce a variable delay between synchronization input pulse arrival and the initiation of the flyback pulse. the fixed delay output of the astable multivibrator is delivered to the horizontal drive transistor which delivers proper pulse timing to the horizontal output circuit. This unique multivibrator combination in a video display permits proper sweep synchronization over a greater range of synchronization signal pulse widths, e.g., 4–40 microseconds, and input frequency capture range, e.g., up to 1500 Hz. The present invention, by increasing synchronization signal injection to the astable multivibrator, permits an increase in the synchronization signal frequency capture range of up to 5000 Hz, or a more than three-fold increase in the previously attainable capture range.

OBJECTS OF THE INVENTION

It is an object of the present invention to provide an improved horizontal drive synchronization system for a video display.

It is another object of the present invention to provide enhanced synchronization signal frequency capture range in a horizontal drive circuit for a video display.

Still another object of the present invention is to provide increased synchronization signal injection to a free-running multivibrator in the horizontal sweep circuit of a video display.

BRIEF DESCRIPTION OF THE DRAWINGS

The appended claims set forth those novel features believed characteristic of the invention. However, the invention itself as well as further objects and advantages thereof, will best be understood by reference to the following detailed description of a preferred embodiment taken in conjunction with the accompanying drawings, in which:

FIGS. 2A thru 2G are waveform diagrams useful in explaining the circuit shown in FIGS. 1A and 1B.

DESCRIPTION OF THE PREFERRED EMBODIMENT

Figure 1B:
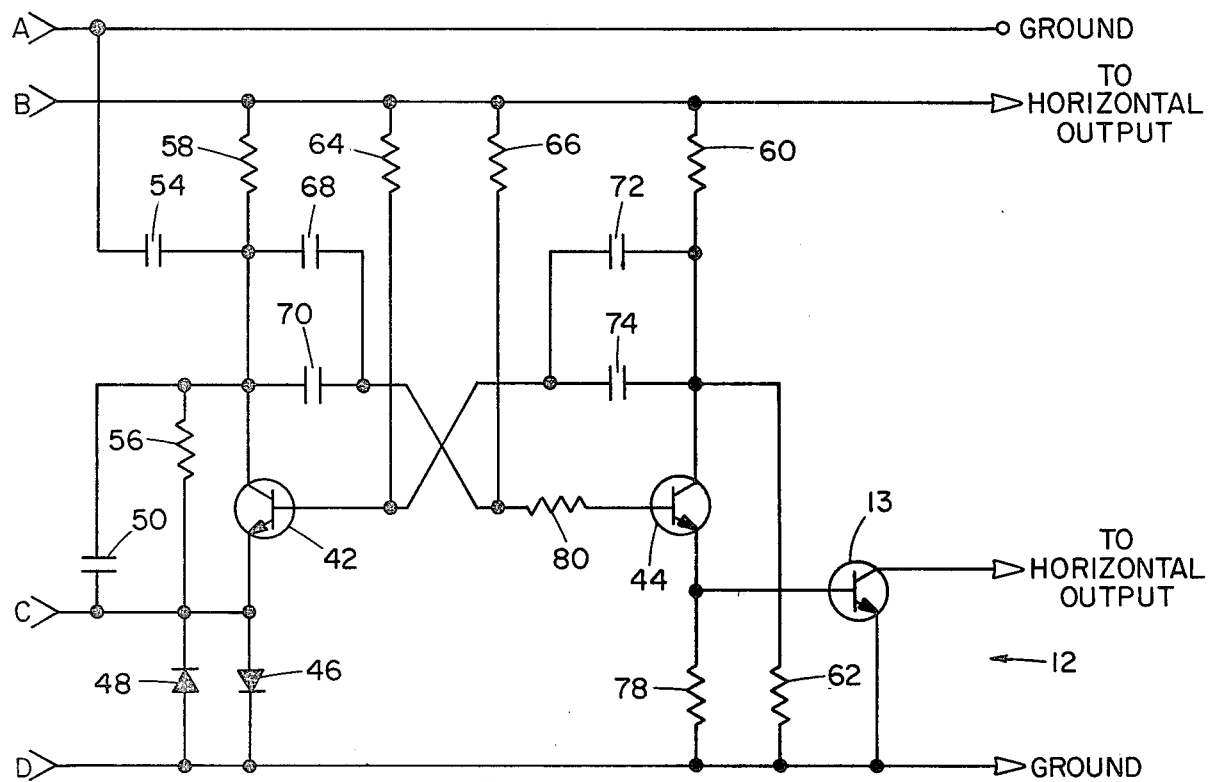
FIGS. 1A and 1B are circuit diagrams showing, in combination, a monostable-astable multivibrator synchronization system for a video display in accordance with the preferred embodiment of the present invention.
Figure 1A:
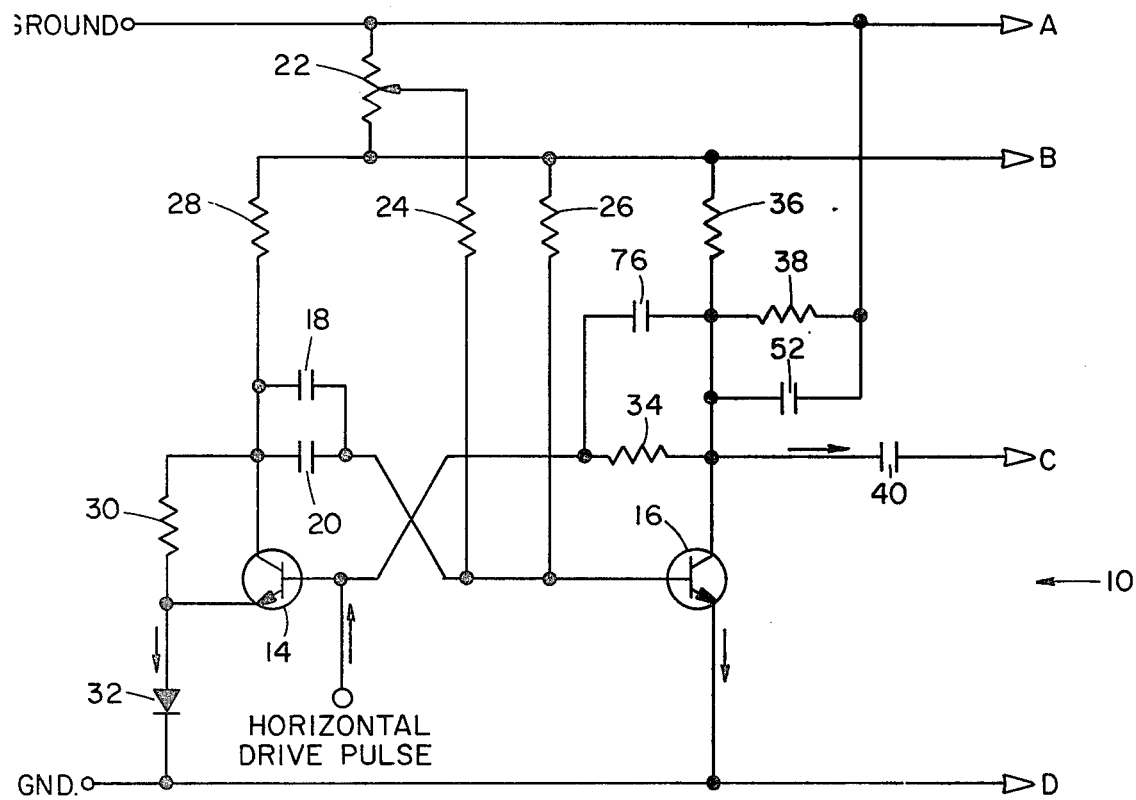

Referring to the circuit diagram of FIGS. 1A and 1B, there is shown a multivibrator synchronization system for a video display in accordance with the preferred embodiment of the present invention. The primary components of this system are a monostable multivibrator 10 and an astable multivibrator 12. The multivibrator synchronization system receives a horizontal drive or synchronization input signal via a synchronization processing circuit (not shown) and processes this signal by means of monostable multivibrator 10 in combination with astable multivibrator 12 in providing an output signal for synchronization and phasing of the horizontal driver 13 with the horizontal drive or synchronization input signal.

The low-level horizontal section consisting of transistors 14 and 16, and associated circuitry, functions as a variable time delay monostable multivibrator. The input trigger for this circuit is provided by the horizontal drive pulse. The input pulse is injected into the base or emitter of transistor 14 through the injection, or synchronization processing, network (not shown). As depicted in FIG. 1A, with the input pulse injected into the base of transistor 14, the monostable multivibrator 10 is responsive to the leading, or positive-going, edge of the input synchronization, or drive, pulse. However, this system will work equally well if synchronization is initiated by the following, or negative-going, edge of the input pulse. In this case the input pulse would be injected into the emitter of transistor 14. Additional elementary modifications would be required to later stages of the horizontal synchronization circuit in changing from leading—to trailing-edge input pulse synchronization.

Transistors 14 and 16 together with capacitors 18 and 20 form the monostable multivibrator 10 which is a one-shot, state-changing device possessing only one stable state which goes from "off" to the "on" position for a specific length of time and then returns to the "off" position waiting for another synchronization, or drive, pulse. With the output of one transistor coupled to the input of the other transistor, transistors 14 and 16 thus coupled form monostable multivibrator 10. Resistors 22 and 24 form a horizontal phasing resistance which is used to vary the length of "on" time of the monostable multivibrator 10. Resistor 22 is a variable resistance potentiometer which, while permitting the varying of the length of "on" time of the monostable multivibrator, does not introduce erroneous inputs due to environmental factors such as temperature and humidity into the multivibrator's pulse setting. This significantly reduces overall oscillator drift.

Capacitors 18 and 20 together with resistors 24 and 26 form a timing circuit which creates the "on" state of monostable multivibrator 10 when a synchronization, or drive, input pulse is received. Resistors 28 and 30 provide biasing for transistor 14 while diode 32 provides for the capability of handling input signals of reverse, or negative-going, synchronization.

Resistors 28 and 30 also serve as a voltage divider network across transistor 14 in dividing down the collector voltage so that the emitter-to-base breakdown voltage of transistor 14 of approximately 7 volts is not exceeded. Potentiometer 22 acts as a speed-up capacitor and a switching circuit in speeding up the turn-off of transistor 14 when transistor 16 turns on. The rapid turning on and turning off of these coupled transistors is essential for proper operation of monostable multivibrator 10. Resistor 34 is connected to the base of transistor 14 and to the collector of transistor 16 and provides a DC current to keep transistor 14 off when transistor 16 is on. Resistors 36 and 38 perform the same function with respect to transistor 16 as resistors 28 and 30 perform for transistor 14, i.e., dividing down the collector voltage so that the transistor's emitter-to-base breakdown voltage is not exceeded. This function is performed by resistors 36 and 38 by controlling the collector voltage of transistor 16.

The output of monostable multivibrator 10 is transmitted to capacitor 40 which couples the monostable multivibrator to astable multivibrator 12. This coupling capacitor 40 provides a synchronization pulse to astable multivibrator 12 which is comprised primarily of transistors 42 and 44. Astable multivibrator 12 is a free-running oscillator which oscillates at whatever frequency it is designed for until it receives an input synchronization signal, at which time it will lock onto the frequency of the input synchronization signal which may be different than its original frequency.

The input synchronization signal to astable multivibrator 12 is produced by the discharge of capacitor 40 which provides a triggering pulse to the emitter of transistor 42. The combination of diodes 46 and 48 provides for transistor 42 to be triggered only by negative-going pulses imposed on the emitter of transistor 42. Diode 46 allows for ignoring the positive transitions because diode 48 can only come one diode drop above ground with the result that signals above this level are essentially clipped-off and never appear as inputs to astable multivibrator 12. However, negative-going transitions turn diode 48 off while pulling the emitter of transistor 42 down which is reflected back to the base of that transistor at the same time thus turning transistor 42 on due to the change in base-emitter voltage. The synchronization, or turn-on, of astable multivibrator 12 is therefore keyed to the trailing, or negative-going, edge of the output pulse of monostable multivibrator 12. It is in this manner that continuously variable timing delays may be incorporated in the horizontal drive output signal in synchronizing horizontal sweep with the input synchronization signal.

In order for astable multivibrator 12 to lock onto the frequency of the input synchronization signal, adequate synchronization signal injection must be provided to it. The required level of synchronization signal input is determined by device and circuit parameters and varies from one environment to another. Enhanced synchronization signal injection notonly provides for more reliable multivibrator operation but also increases synchronization input signal range for multivibrator lock-on. However, excessive synchronization signal energy inputs to astable multivibrator 12 result in 180° phase shift problems, phase jitter and arcing during which astable multivibrator 12 becomes locked in a shutdown mode with transistors 42 and 44 turned hard on in a saturation mode. To preclude the occurrence of this undesirable oscillatory mode, diode 48 is incorporated to limit the energy of the synchronization input pulse provided to astable multivibrator 12. Because diode 48 can only come one diode drop above ground, signals greater than this level are essentially filtered out from the input to astable multivibrator 12. To compensate for this reduction in synchronization signal input to astable multivibrator 12, the present invention is incorporated in this multivibrator combination to maintain reliable synchronization performance and enhance synchronization signal frequency capture range.

In accordance with the present invention, capacitor 50 provides for increased synchronization injection into astable multivibrator 12. Capacitor 50 provides the same synchronization pulse transmitted through capacitor 40, which goes to the emitter of transistor 42, to the base of transistor 44. Thus, the synchronization pulse generated by capacitor 40 is supplied to both coupled transistors in astable multivibrator 12 thus providing increased input synchronization signal injection to astable multivibrator 12.

Capacitor 52 rolls off the leading edge of the monostable multivibrator output pulse while preserving the trailing, or synchronization edge which is controlled by the turn-on of transistor 16. The turn-on of transistor 16 is hard enough so that capacitor 52 is rapidly discharged while the turn-off of transistor 16 has a lesser effect on capacitor 52 because only resistances are left to charge it up. Thus, a smooth action results on the output pulse of monostable multivibrator 10 on the pulse edge not used for synchronization while a sharp signal fall-off is preserved on the edge used for synchronization.

Capacitor 54 is incorporated to remove spurious noise inputs to the collector of transistor 42. These spurious inputs result in a shifting in the phase delay of the synchronization signal output of the horizontal synchronization circuit which appears on the video display as, for example, improper line-up of the dots of a particular letter presented on the display.

Resistors 56 and 58 provide collector load resistance for transistor 42 and also form a voltage divider which limits the collector voltage of transistor 42. Resistor 56 also provides a DC bias for diode 46 which maintains it in a constant "on" state except when a negative pulse synchronization signal is transmitted by capacitor 50. Resistors 50 and 62 perform the same function with respect to transistor 44 as resistors 56 and 58 perform for transistor 42, namely, acting as collector load resistances and as voltage limiters to establish proper collector voltage.

Resistors 64 and 66 together with capacitors 68, 70, 72 and 74 provide an RC network which establishes the timing of astable multivibrator 12. In addition, when the collector voltage of transistor 16 goes low it is transmitted across capacitor 76 to capacitors 72 and 74, which, in turn, provide a negative-going pulse to the base of transistor 42. Resistor 78 provides an "off" resistance to the horizontal driver transistor 13 while resistor 80 performs a similar function for transistor 44.

The present invention thus compensates for the reduction in the synchronization window caused by diode 48 in limiting synchronization signal input energy to astable multivibrator 12. It compensates for the small synchronization window effect of diode 48 by providing increased synchronization signal injection to astable multivibrator 12. Discharge of capacitor 50 provides the same synchronization input pulse to the base of transistor 44 as is provided to the emitter of transistor 42. This increased synchronization signal strength input to astable multivibrator 12 not only significantly increases synchronization reliability of this monostable-astable multivibrator combination, but also increases the synchronization signal frequency capture range to 4000–5000 Hz from the previous value of approximately 1500 Hz.

FIGS. 2A thru 2G show the various signals processed and generated by the horizontal synchronization circuit. FIG. 2A shows the synchronization or drive input pulses provided to the synchronization processing circuit (not shown). The individual synchronization or drive input pulses may vary from 4 to 40 microseconds with the synchronization processing circuit responsive to the leading, or right-hand, edge of the individual synchronization or drive input pulses. FIG. 2B shows the monostable multivibrator trigger pulses transmitted by the synchronization processing circuit to the monostable multivibrator 10. These pulses correspond to the positive-going edge of the synchronization or drive input pulses. The negative pulses corresponding to the negative-going edge of the synchronization or drive input pulses which are not transmitted because of signal processing within the synchronization processing circuit are shown as dotted pulses in FIG. 2B. The variable width output pulses of the monostable multivibrator 10 which are generated in response to the leading edge of the synchronization or drive input pulses are shown in FIG. 2C. The pulse width of monostable multivibrator output pulses is variable by means of potentiometer 22. Thus, every positive-going input signal results in the generation of a pre-set pulse of constant width by monostable multivibrator 10. A negative-going edge of the monostable multivibrator output pulse results in the triggering of astable multivibrator 12 as shown in FIG. 2D. The dotted pulses in FIG. 2D represent the variable position of these trigger pulses as established by potentiometer 22 in setting the pulse width of the monostable multivibrator output pulses. The small positive pulses in FIG. 2D represent those pulses cut off by the diode network consisting of diodes 46 and 48.

The astable multivibrator trigger pulses key the astable multivibrator 12 which, in turn, generates a pulse of constant width as shown in FIG. 2E. The dotted lines in FIG. 2E represent the variable positioning of the astable multivibrator output pulses made possible by varying the width of the monostable multivibrator output pulses. Astable multivibrator 12 locks onto the pulse repetition rate of monostable multivibrator 10 and introduces a fixed delay between the start of synchronization and the initiation of the horizontal flyback pulse. The first part of this delay period is determined by the value set in monostable multivibrator 10 by means of potentiometer 22 while the second component of this delay period is determined by the inherent, unchanging characteristics of astable multivibrator 12. As shown in FIGS. 2E and 2F, the astable multivibrator output pulses cause the horizontal driver 13 to generate output pulses of fixed duration. The duration of horizontal driver output pulses equals that of the astable multivibrator output pulses. A certain amount of ripple, or instability, is shown in the initial portion of a horizontal driver output pulse following receipt by the horizontal driver 13 of an astable multivibrator output pulse, as depicted in FIG. 2F. By means of the timing intervals introduced by monostable multivibrator 10 and astable multivibrator 12 video information is delayed on entire horizontal sweep line. This variable time delay interval permits the input signal's blanking interval to be positioned as desired with respect to the video input signal. This is shown in FIG. 2G where the horizontal active video signal is positioned between two adjacent flyback pulses. The flyback pulses are initiated by the negative-going, or left-hand, edge of an astable multivibrator output pulse. The dotted pulses shown in FIG. 2G are intended to illustrate the flexibility which the present multivibrator combination offers in positioning the flyback pulses relative to the received video signal.

There has thus been disclosed an improved synchronization signal injection system for a monstable-astable multivibrator combination for increasing synchronization signal frequency capture range and improving multivibrator synchronization system performance. The invention disclosed herein compensates for a reduction in astable multivibrator synchronization signal injection to eliminate spurious multivibrator inputs by providing synchronization signal inputs from the monostable multivibrator to both coupled transistors of the astable multivibrator.

In addition, while particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a horizontal deflection circuit of a video display including a free-running multivibrator with coupled input and output transistors for synchronizing the horizontal scansion of said video display with regularly recurring synchronization signals from a received composite video signal, signal processing means for coupling said regularly recurring synchronization signals to the input transistor of said free-running multivibrator, and sweep driver means for receiving the output of the output transistor of said free-running multivibrator to drive said horizontal deflection circuit in synchronization with the synchronization signals from said received composite video signal, the improvement comprising:

means for limiting the amplitude of said synchronization signals provided by said signal processing means to said free-running multivibrator to a predetermined voltage level to eliminate spurious inputs to said free-running multivibrator; and means for coupling said synchronization signals provided by said signal processing means to the output transistor of said free-running multivibrator to compensate for limiting synchronization signal amplitude to said free-running multivibrator by enhancing synchronization signal injection to said free-running multivibrator thereby increasing the synchronization signal frequency capture range and reliability of said free-running multivibrator.

2. A horizontal deflection circuit as set forth in claim 1, wherein said means for limiting the amplitude of said synchronization signals provided to the input transistor of said free-running multivibrator includes first and second coupled diodes with said first diode permitting only negative synchronization signals to be provided to said input transistor and said second diode limiting the amplitude of said negative synchronization signals to the diode drop voltage of said second diode.

3. A horizontal deflection circuit as set forth in claim 1, wherein said input and output transistors are NPN transistors and said means for coupling said synchronization signals to the output transistor of said free-running multivibrator includes capacitor means providing synchronization signal injection to the base of said output transistor with the input synchronization signals provided to the emitter of said input transistor.

4. A horizontal deflection circuit as set forth in claim 3, wherein the base of said input transistor is coupled to the collector of said output transistor and the base of said output transistor is coupled to the collector of said input transistor.

5. A horizonal deflection circuit as set forth in claim 1, wherein said signal processing means for coupling said regularly recurring synchronization signals to said free-running multivibrator comprises a monostable multivibrator in combination with capacitor means whereby a predetermined, variable time delay is provided between the receipt of said synchronization signals by said signal processing means and the receipt by said sweep driver means of the output signal of the output transistor of said free-running multivibrator.

6. In a horizontal deflection circuit of a video display including a free-running multivibrator with coupled input and output transistors for synchronizing the horizontal scansion of said video display with regularly recurring synchronization signals from a received composite video signal, signal processing means including a monostable multivibrator in combination with capacitor means for coupling said regularly recurring synchronization signals to the input transistor of said free-running multivibrator and for providing a predetermined, variable time delay between the receipt of said synchronization signals by said signal processing means and the receipt of the input signal by the input transistor of said free-running multivibrator, and sweep driver means for receiving the output of the output transistor of said free-running multivibrator to drive said horizontal deflection circuit in synchronization with the synchronization signals from said received composite video signal, the improvement comprising:

means for limiting the amplitude of said synchronization signal provided to the input transistor of said free-running multivibrator to a predetermined voltage level to eliminate spurious inputs to said free-running multivibrator, said signal limiting means including first and second coupled diodes with said first diode permitting only negative synchronization signals to be provided to said input transistor and said second diode limiting the amplitude of said negative synchronization signals to the diode drop voltage of said second diode; and means for coupling said synchronization signal provided by said signal processing means to the output transistor of said free-running multivibrator for enhancing synchronization signal injection to said free-running multivibrator thereby increasing the synchronization signal frequency capture range and reliability of said free-running multivibrator, said coupling means including a capacitor for providing synchronization signal injection to the base of said output transistor with the input synchronization signals provided to the emitter of said input transistor.

* * * * *